(12) United States Patent
Epworth et al.

(10) Patent No.: US 6,381,388 B1
(45) Date of Patent: Apr. 30, 2002

(54) CHROMATIC DISPERSION COMPENSATION

(75) Inventors: Richard Epworth, Sawbridgeworth; Julian A Fells, Epping, both of (GB)

(73) Assignee: Nortel Networks Limited, St. Laurent (CA)

( * ) Notice: Subject to any disclaimer, the term of this patent is extended or adjusted under 35 U.S.C. 154(b) by 46 days.

(21) Appl. No.: 09/653,984

(22) Filed: Sep. 1, 2000

(51) Int. Cl.[7] ................................................. G02B 6/34
(52) U.S. Cl. ........................... 385/37; 385/24; 359/130; 372/102
(58) Field of Search ................................ 385/37, 24, 11, 385/27, 31, 123; 359/130, 161; 372/102, 20

(56) References Cited

U.S. PATENT DOCUMENTS

| | | | |
|---|---|---|---|
| 4,953,939 A | 9/1990 | Epworth | 385/37 |
| 5,694,501 A | 12/1997 | Alavie et al. | 385/37 |
| 5,715,265 A * | 2/1998 | Epworth | 372/20 |

OTHER PUBLICATIONS

Dispersion compensation in 20Gbit/s dynamic nonlinear lightwave systems using electrically tunable chirped fibre grating. Electronic letter May 13, 1999 vol. 35, No. 10 B J Eggleton, et al.

Dynamic Dispersion compensation in a 10–Gb/s Optical System Using a Novel Voltage Tuned Nonlinearity Chirped Fiber Bragg Grating IEEE Mar. 1999 No. 3 vol. 11 pp. 373–375 K M Feng et al.

Dispersion Tuning of a Linearly Chriped Fiber Bragg Grating Without a Center Wavelength Shift by Applying a Strain Gradient. T Imai et al. IEEE Jun. 1998, pp. 845–847.

* cited by examiner

*Primary Examiner*—Phan T. H. Palmer
(74) *Attorney, Agent, or Firm*—Lee, Mann, Smith, McWilliams Sweeney & Ohlson

(57) ABSTRACT

An optical waveguide provided with a linearly chirped Bragg reflective grating can be employed as a device that provides linear dispersion compensation. The amount of the linear dispersion thereby provided can be rendered adjustable by adjustment of the magnitude of axial strain imposed upon the grating. If the chirp is purely linear, and if also, the strain is at all times uniform along the length of the grating, adjustment of the strain magnitude will have no such effect. This requires the presence of a quadratic chirp term, but such a term introduces its own transmission penalty. This penalty is compensated at least in part by causing the light to make a reflection in a second Bragg reflection grating identical with the first, but oriented to provide a quadratic component of chirp that has the opposite sign to that of the first Bragg reflection grating.

8 Claims, 7 Drawing Sheets

CHROMATIC DISPERSION COMPENSATION

FIELD OF THE INVENTION

This invention relates to the compensation of chromatic dispersion, hereinafter referred to as dispersion, in optical transmission systems.

Linear (first order) dispersion, D, is the measure of the rate of change of group delay, $\tau$, with wavelength, $\lambda$. ($D=d\tau/d\lambda$.) Linear dispersion is typically measured in picoseconds per nanometer (ps/nm). In the case of a transmission medium, for instance an optical fibre waveguide, whose waveguiding properties are uniform along its length, the linear dispersion exhibited by the medium is proportional to its length and so, for such a medium, it is convenient to define its linear dispersion per unit length, also known as its linear dispersion power. This is typically measured in picoseconds per nanometer per kilometer (ps/nm/km).

The value of the linear dispersion of a transmission path is generally itself a function of wavelength, and so there is a quadratic (second order) dispersion term, Q, also known as dispersion slope, which is a measure of the rate of change of linear dispersion with wavelength. ($Q=dD/d\lambda=d^2\tau/d\lambda^2$.) This is typically measured in picoseconds per nanometer squared (ps/nm$^2$). In some, but not all instances, the effects of quadratic dispersion in NDS and DC fibre (non dispersion shifted fibre, and dispersion compensating fibre) are small enough not to assume significance. There are also higher dispersion terms, whose effects generally assume even less significance.

BACKGROUND TO THE INVENTION

In a digital transmission system the presence of dispersion leads to pulse broadening, and hence to a curtailment of system reach before some form of pulse regeneration becomes necessary. The problem presented by dispersion increases rapidly with increasing bit rate. This is because, on the one hand, increasing the bit rate produces increased spectral broadening of the pulses, and hence increased dispersion mediated pulse broadening; while on the other hand, increasing the bit rate also produces a reduction in the time interval between consecutive bits. In a WDM (wavelength division multiplexed) digital transmission system, it is not practical to minimise the problems of dispersion by choosing to employ a transmission medium exhibiting near-zero first order dispersive power because low first order dispersive power is associated with aggravated non-linear (e.g. four-wave mixing) distortion. A known solution to this problem is to employ 'managed dispersion' in which near-zero aggregate linear dispersion over a particular transmission path is achieved by the use of alternating sections respectively exhibiting positive linear dispersion and negative linear dispersion, for instance by the use of NDS (non-dispersion-shifted) and DC (dispersion-compensated) optical fibre waveguide.

Having regard to the manufacturing tolerances in practice encountered in the fabrication of NDS and DC fibre, achieving adequately low aggregate linear dispersion becomes increasingly difficult as the bit rate is increased. Consider for instance a 40 Gbit/s WDM transmission system with a reach of 400 km, and with the shortest and longest wavelength channels separated by 200 nm. The actual amount of linear dispersion in any particular channel that can be tolerated will of course be dependent upon a number of system parameters, but typically may lie in the region of 100 ps/nm. A typical NDS fibre exhibits, at a wavelength of 1550 nm, a linear dispersive power of approximately 17 ps/(nm·km), and a quadratic dispersive power of approximately 0.058 ps/(nm$^2$·km). Currently DC fibre is fabricated to a tolerance of ±3% in respect of linear dispersive power, and a tolerance of ±20% in respect of quadratic dispersive power. Therefore, for the 400 km span length, the uncertainty in linear dispersion compensation at the 1550 nm wavelength will amount to approximately 400 ps/nm ($\approx$400×17×0.06 ps/nm). Given the 200 nm wavelength range, the additional uncertainty at the wavelength extremities produced by the ±20% quadratic tolerance amounts approximately to a further 900 ps/nm ($\approx$400×0.058×200×0.2 ps/nm). To this must be added any uncertainty arising from any imprecision in the knowledge of the length and dispersion of the transmission fibre.

The foregoing indicates that, even if the DC fibre were manufactured to tolerances tightened by an order of magnitude, those tolerances would still be large enough to cause difficulty in achieving an accurate enough compensation for the reliable provision of an operating point near the centre of the 100 ps/nm window.

There is therefore a useful role for an adjustable amplitude linear dispersion compensation device. Such a device could be one designed for operation on its own to achieve the totality of dispersion compensation. Alternatively, it could be one designed for operation in association with a fixed amplitude dispersion compensation device, such as a length of DC fibre, that provides a level of compensation that is inadequately matched on its own. The adjustable device may be operated with some form of feedback control loop to provide active compensation that can respond to dynamic changes of dispersion within the system, and in suitable circumstances to step changes resulting from re-routing occasioned for instance by a partial failure of the system such as a transmission fibre break.

An alternative way of providing dispersion which may be used for dispersion compensation purposes utilises spectrally distributed reflection of light produced by a chirped Bragg grating extending in the axial direction of an optical waveguide. Such a method is for instance described in U.S. Pat. No. 4,953,939. Operating upon an optical waveguide with a Bragg reflective grating in such a way as to modify the pitch of its grating elements can have the effect of producing a change in the dispersion exhibited by that device, but in certain circumstances will not do so. Thus, if the starting point is a device with a uniform pitch Bragg grating, this device reflects light at the Bragg wavelength determined by that pitch, and the effect of the grating is not such as to impart any dispersion. If now the device is uniformly stretched, the magnitude of the pitch is changed, the Bragg reflection wavelength is changed, but the grating still does not impart any dispersion. A similar situation pertains if, instead of stretching the fibre to change the pitch of its grating elements, its effective pitch (the product of physical pitch with effective refractive index) is changed by a uniform heating of the grating. On the other hand, if the heating is not uniform, but is such as to produce a thermal gradient along the waveguide axis in the region of the grating, then the effect of this heating is to introduce chirp where none was present before, and hence is to introduce a measure of dispersion. Controlling the magnitude of the thermal gradient controls the magnitude of the resulting chirp, and thus there is provided a form of adjustable amplitude linear dispersion compensation device. Such a device is for instance described by B J Eggleton et al. in, 'Dispersion compensation in 20 Gbit/s dynamic nonlinear lightwave systems using electrically tunable chirped fibre grating', Electronics Letters Vol. 35, No. 10, pp 832–3.

Similarly, if the waveguide is subjected to a stretching that is not uniform, but is such as to produce a strain gradient along the waveguide axis, then the effect is to produce a controllable amplitude of chirp where none was present before. One example of such a device, a device in which a strain gradient is imparted to an optical fibre waveguide by bonding a portion of its length to a cantilever, and then bending that cantilever, is described by T Imai et al. in, 'Dispersion Tuning of a Linearly Chirped Fiber Bragg Grating Without a Center Wavelength Shift by Applying a Strain Gradient', IEEE Photonics Technology Letters, Vol. 10, No. 6, pp 845–7. Another example of such a device, a device in which a strain gradient is imparted to an optical fibre by bonding it to the side of a stack of electrostrictive elements, and then applying a differential drive to those elements, is described in U.S. Pat. No. 5,694,501. In the thermal and both strain based examples there is a liability to problems arising from the fact that any significant change of chirp is associated with a change in reflectivity. In the case of the thermal example there are the additional problems of slow response and of maintaining a controlled temperature gradient in s system environment as opposed to a controlled laboratory environment. In the case of the cantilever device, there are problems associated with the bonding of the fibre adequately to the cantilever, and extraneous dispersion non-linearities are introduced by virtue of the fact that the radius of curvature is typically a non-linear function of distance along the cantilever. In the case of the piezoelectric stack device, there are similar bonding problems, and there are cost and reliability problems associated with the complexity of the stack and the differential drive requirements of the component elements.

It has already been explained why the uniform stretching of an optical waveguide possessing a uniform pitch Bragg reflection grating does not introduce any change in linear dispersion. It can additionally be seen that uniform stretching similarly produces a negligible change in linear dispersion if the grating is linearly chirped. However, as for instance disclosed by K -M Feng et al. in, 'Dynamic Dispersion in a 10-Gbit/s Optical System Using a Novel Voltage Tuned Nonlinearly Chirped Fiber Bragg Grating', IEEE Photonics Technology Letters, Vol. 11, No. 3, pp 373–5, the uniform stretching of an optical waveguide possessing a chirped Bragg grating with a quadratic component of its chirp does induce a change in the linear dispersion afforded by the structure.

The above-referenced paper by Feng et al. demonstrates, both in terms of eye diagram and BER measurement, how the use of their non-linearly chirped grating can be operated to reduce the receiver sensitivity penalty (increase in receiver signal power required to meet a given BER at 10 Gbit/s) of an uncompensated transmission system, and specifically attributes a residual receiver sensitivity penalty mainly to an imperfect compensation of the dispersion. We have determined that another factor is involved, namely that the presence of quadratic dispersion itself introduces a receiver sensitivity penalty.

It is for instance estimated that, in the case of a 40 Gbit/s NRZ system in which the quadratic dispersion amounts to only 40 ps/nm$^2$, this penalty may amount to about 0.25 dB, and that the penalty increases in an approximately linear fashion with increasing quadratic dispersion, at least as far as a quadratic dispersion of 300 ps/nm$^2$. This estimation is based on a simulation using a 128 bit Pseudo Random Bit Sequence generated with raised-cosine rising and falling edges. This is converted to an optical signal using the amplitude and phase response of a Mach-Zehnder modulator with symmetrical drive. The signal is then modified by the response of an optical fibre which can introduce quadratic dispersion across the modulation bandwidth. The resultant output from such a simulation is a pulse sequence, which is distorted in relation to the input pulse sequence. One way in which to assess the degradation is to overlay each received bit on top of its predecessors to generate an eye diagram. The actual method of assessing this eye diagram involves measuring quantitatively the amount of opening in the eye pattern. This figure is then compared to that of the system when there is no fibre in place. The ratio of these two figures is expressed in dB and quoted as a 'penalty'. The results of this estimation would prima facie suggest the choice of a grating with a low modulus quadratic chirp. However, for any given range of linear dispersion adjustment, a reduction in the modulus of quadratic chirp requires a corresponding increase in both grating length and the amount of strain required to sweep through that range. Good quality long Bragg reflection gratings are difficult to fabricate in optical waveguide because they are typically written in the guide sequentially section by section in short sections that need to be critically positioned with respect to each other to avoid excessive stitch error mediated quality degradation. Additionally, excessive strains are unwelcome because of associated problems of susceptibility to catastrophic failure by fracture.

Consider the general case of a structure for which the delay, expressed as a function of (free space) wavelength has only a zero offset, a linear component and a quadratic component, i.e. a structure that satisfies the relationship:

$$\tau(\lambda)=a_0+a_1\lambda+a_2\lambda^2 \quad (1)$$

The linear dispersion is therefore given by:

$$D(\lambda) = \frac{d\tau}{d\lambda} = a_1 + 2a_2\lambda \quad (2)$$

and the quadratic dispersion by:

$$Q(\lambda) = \frac{dD}{d\lambda} = \frac{d^2\tau}{d\lambda^2} = 2a_2 \quad (3)$$

(Equation (3) shows that, because the differential group delay contains no cubic or higher order term, the quadratic dispersion, Q, is actually a constant, $2a_2$, rather than a term functionally dependent upon wavelength,$\lambda$.) Equation (1) may with advantage be rewritten in terms of the zero offset delay $\tau_0$, the linear dispersion $D_0$, and quadratic dispersion $Q_0$ values ($Q_0$=Q) pertaining to some chosen baseline wavelength $\lambda_0$. This baseline wavelength $\lambda_0$ is typically a wavelength at one end of (or in the middle of) the wavelength range over which dispersion compensation is required. Such a rewriting gives:

$$\tau(\lambda) = \left(\tau_0 - D_0\lambda_0 + \frac{Q_0}{2}\cdot\lambda_0^2\right) + (D_0 - Q_0\lambda_0)\lambda + \frac{Q_0}{2}\cdot\lambda^2 \quad (4)$$

Under the assumption that the delay is produced by a non-linearly chirped Bragg grating in an optical waveguide with an effective refractive index n, each wavelength component $\lambda$ of the incident light is effectively reflected at some specific distance $z(\lambda)$ along the length of the grating. The delay $\tau(\lambda)$ is therefore the folded physical path length (2z) divided by the propagation speed of light in the waveguide (c/n), where c is the in vacuo speed of light.

Hence:

$$\tau(\lambda) = \frac{2n}{c} \cdot z(\lambda) \quad (5)$$

Substituting equation (5) in equation (4) together with:

$$\Delta\lambda = \lambda - \lambda_0 \quad (6)$$

gives:

$$\tau(\lambda) = \frac{2n}{c} \cdot z(\lambda) = \tau_0 + D_0 \cdot \Delta\lambda + \frac{Q_0}{2} \cdot \Delta\lambda^2 \quad (7)$$

Equation (7) is a quadratic equation in $\Delta\lambda$ whose solution, under the condition that z=0 at $\tau_0$=0, is given by:

$$\Delta\lambda = \frac{-D_0 \pm \sqrt{D_0^2 + \frac{4Q_0 n}{c} \cdot z}}{Q_0} \quad (8)$$

Remembering that the physical pitch, $\Lambda$, of the grating, is related to the Bragg wavelength $\lambda$ by:

$$\lambda = 2n \cdot \Lambda \quad (9)$$

equation (8) also provides a description of the pitch variation of the grating. Differentiating equation (7) with respect to $\lambda$, and rearranging, gives:

$$D(\lambda) = D_0 + Q_0 \cdot \Delta\lambda \quad (10)$$

Accordingly, ignoring the bandwidth limiting effects produced by apodisation of the grating, a linear dispersion range $\Delta D = D_1 - D_0$ requires a bandwidth:

$$B = \lambda_1 - \lambda_0 = \frac{\Delta D}{Q_0} \quad (11)$$

Substituting equation (11) in equation (7) to find the grating length, $\Delta z$, gives:

$$\Delta z = \frac{c}{4nQ_0}(2D_0 \cdot \Delta D + \Delta D^2) \quad (12)$$

Equation (12) defines the length of a grating that is required to meet a given design specification. For instance, assuming n=1.5, and that a linear dispersion range from $D_0$=100 ps/km to $D_1$=500 ps/km is required with a quadratic dispersion mediated receiver sensitivity penalty limited by limiting the quadratic dispersion to $Q_0$=20 ps/km²; equation (12) determines that the grating must be 600 mm long. For many application this is inconveniently long, and moreover would involve excessive stretching to cover the full range (a strain range of approximately 1.2% for operation in the wavelength region of 1550 nm). Increasing the quadratic dispersion limit by a factor of ten to $Q_0$=200 ps/km² reduces the grating length, and the strain range, each by a factor of ten, but only achieves this at the expense of a significant increase in receiver sensitivity penalty.

Implicit in the foregoing analysis is the assumption that quadratic chirp of a Bragg reflection grating produces an equivalent quadratic component of group delay. This is not an exact relationship, but it is a close approximation.

In the specification of patent application Ser. No. 09/385,939 filed Aug. 30, 1999, which is assigned to a common assignee, and the contents of which are incorporated herein by reference, there is described a way of cancelling, at least in part, the receiver sensitivity penalty of an adjustable linear dispersion compensator that employs a waveguide provided with chirped Bragg reflection grating that has a quadratic component of chirp. Specially, this penalty is compensated at least in part by causing the light to make a reflection in a further Bragg reflection grating whose quadratic component of chirp has the opposite sign to that of the other Bragg reflection grating, but a substantially matched modulus.

SUMMARY OF THE INVENTION

The specification referenced in the preceding paragraph explains that the magnitude of the linear dispersion afforded by such a structure may be adjusted by a differential straining of the two gratings, and describes in detail how such differential straining may be effected by imparting either compressive or tensile axial strain of variable magnitude to one of the gratings while leaving the other grating unstrained.

The present invention is directed to a modification of the foregoing, the modification involving a tensile straining of the gratings, and effecting a linear dispersion adjustment by increasing the tensile strain in one grating while the strain in the other is reduced by a substantially equivalent amount.

For the application of strain employing a geometry in which the required movement of the strain actuator is relatively small, the use of a piezoelectric element may be preferred. For other geometries involving a larger movement on the part of the actuator, a mechanical form of actuator, such as a linear movement employing a motor-driven differential screw-thread drive, may be more suitable. In the latter instance, a supplemental piezoelectric element may be included for effecting fine adjustment.

In a typical implementation of a dispersion adjuster employing an optical fibre Bragg grating with a quadratic component to its chirp, it is found that, for a given upper limit to the length of the grating, it is not the safe limit of strain that the fibre can sustain that limits the range of dispersion adjustment provided by the device, but rather that the limit is set by the minimum practical value of minimum dispersion, $D_0$. In consequence, one of the advantages arising out of the modification is that, for a given upper limit to the length of the gratings, the range of dispersion adjustment afforded by the device is expanded approximately twofold.

Another advantage of the modification is that it can be implemented in a form in which the two gratings are arranged alongside each other in close proximity. This can make them less sensitive to perturbations brought about by adventitious changes in environment. Furthermore, the arrangement is amenable to making provision for adjustment of the waveband center wavelength of the device independently of the adjustment of the magnitude of dispersion it provides. Additionally, the two gratings may be identical, or at least substantially identical (opposite signs of quadratic chirp being provided by directing the light through the gratings from opposite ends), thereby facilitating the construction of means to effect compensation of their temperature sensitivity that arises from the thermo-optic (dn/dt) coefficient of the two fibres.

According to a first aspect of the present invention, there is provided a method of providing linear optical dispersion of adjustable magnitude, in which method light is caused to make in sequence first and second spectrally distributed reflections respectively in first and second single mode optical fibre waveguides, which reflections are made respectively in first and second chirped Bragg grating reflectors present in first and second tensile strained respective regions of the first and second fibre waveguides, wherein, in the absence of strain in said regions, said gratings exhibit quadratic chirp of substantially matched modulus, and are in relative orientation such that the quadratic chirp that they exhibit to said light is of opposite sign, and in which method the value of linear dispersion afforded to said light is adjusted by reducing the tensile strain in one of said first and second regions while increasing, by a substantially equivalent amount, the tensile strain in the other of said regions.

According to a second aspect of the present invention, there is provided a device exhibiting linear optical dispersion of adjustable magnitude, which device includes first and second optical fibre waveguides provided with respective first and second chirped Bragg reflection grating, which gratings exhibit, in the absence of strain, quadratic chirp of substantially matched modulus, and which gratings are arranged to define an optical transmission path that includes sequential reflection in both gratings with a relative orientation to provide quadratic chirp of opposite sign, which device maintains each fibre waveguide, over the length of its Bragg grating, in substantially uniform tensile strain, and includes a differential mode strain adjuster operative to adjust the magnitude of the dispersion exhibited by the device by reducing the tensile strain in one of said first and second gratings while increasing, by a substantially equivalent amount, the tensile strain in the other of said gratings.

Other features and advantages of the invention will be readily apparent from the following description of preferred embodiments of the invention, from the drawings and from the claims.

DETAILED DESCRIPTION OF PREFERRED EMBODIMENTS

Figure 1:
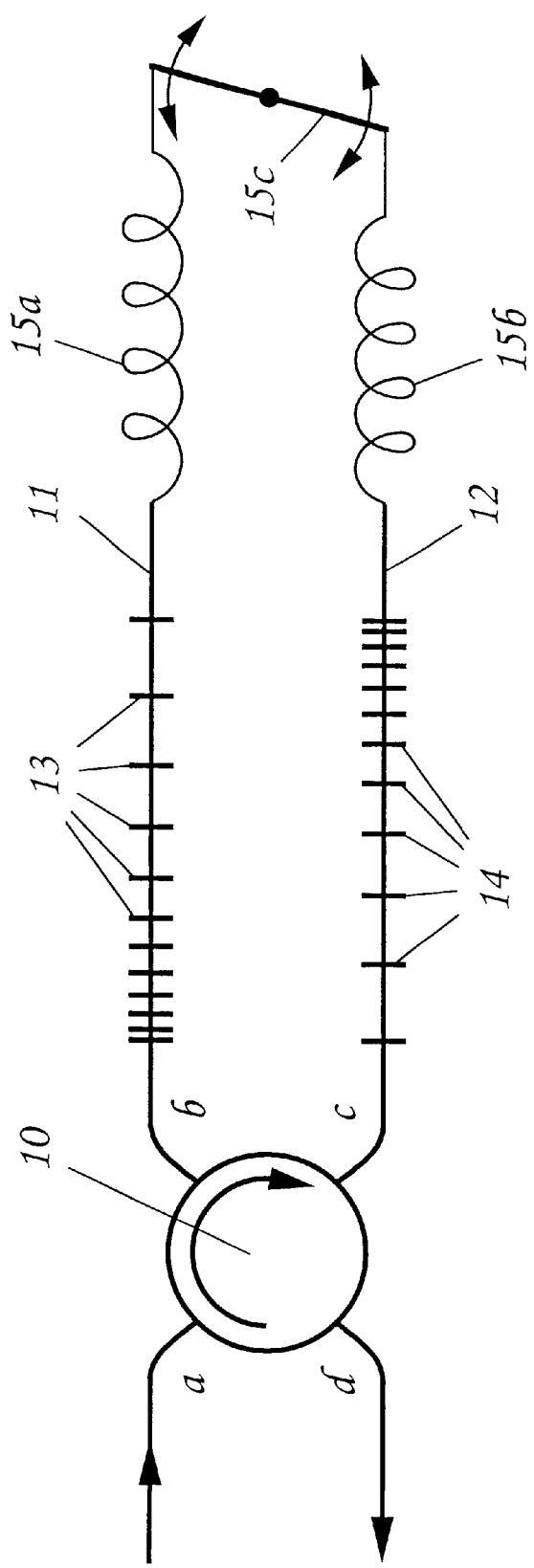
FIG. 1 is a schematic diagram illustrating the principles of operation of an adjustable dispersion compensating device constructed in accordance with the teachings of the present invention.

The adjustable dispersion compensation device of FIG. 1 has three principal components: a four-port circulator 10, two optical fibres 11 and 12 provided with respective chirped Bragg reflective gratings 13 and 14, and some form of adjustable differential tensile strain applicator for axially straining the two waveguides 11 and 12 uniformly over the lengths of their respective gratings 13 and 14 (this strain applicator being symbolically represented in this Figure by a pair of helical springs 15a and 15b differentially coupled by means of a pivoted lever 15c). Light that enters the circulator 10 by way of its port 'a' emerges by way of its port 'b', to which fibre 11 with its grating 13 is optically coupled. The light that is reflected by this grating 13 re-enters the circulator by way of port 'b', and re-emerges by way of its port 'c', to which fibre 12 with its grating 14 is optically coupled. The light that is reflected by this grating 14 re-enters the circulator by way of port 'c', and re-emerges by way of its port 'd'.

Figure 3:
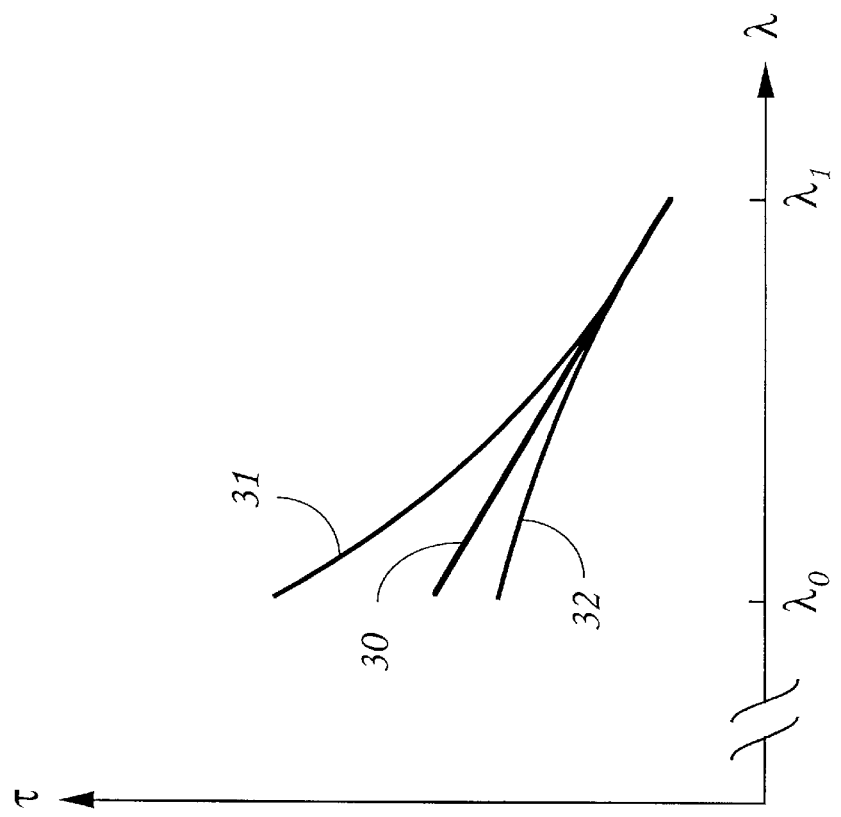
FIGS. 2 and 3 are representative plots illustrating how differential group delay, $\tau$, varies as a function of Bragg reflection wavelength, $\lambda$, in respect of different combinations of linear and quadratic chirp.
Figure 2:
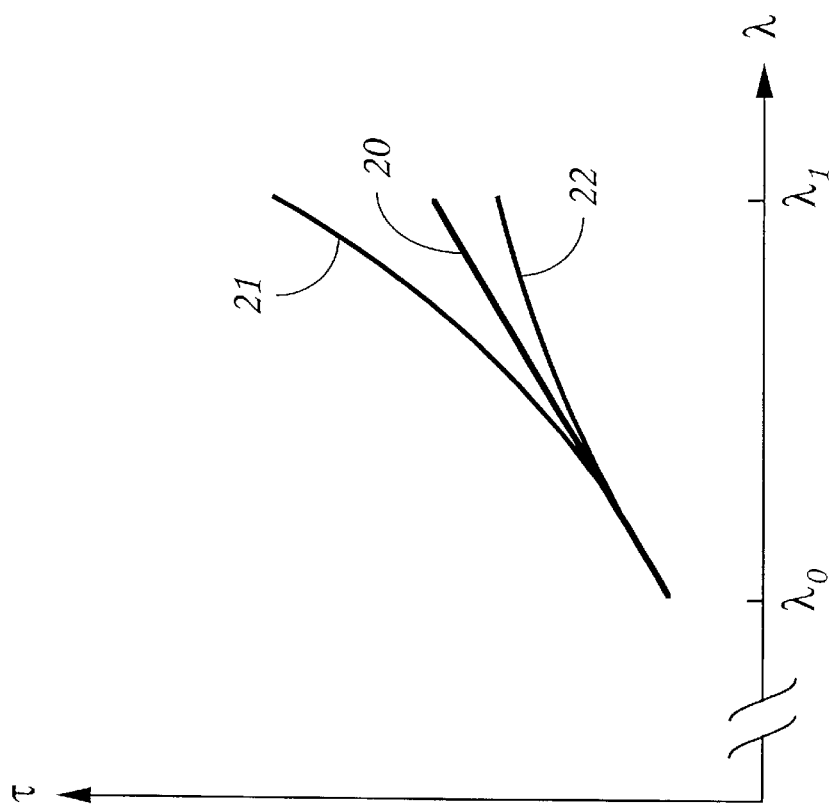

FIGS. 2 and 3 depict how differential group delay, $\tau$, varies as a function of Bragg reflection wavelength, $\lambda$, in respect of different combinations of linear and quadratic chirp. In the case of linear chirp with no attendant quadratic chirp, the relationship is depicted by linear trace 20 of FIG. 2 in respect of positive linear chirp, and by linear trace 30 of FIG. 3 in respect of negative chirp. Traces 21 and 31 show the effect of adding a positive component of quadratic chirp respectively to the linear chirps of traces 20 and 30. Correspondingly, traces 22 and 32 show the effect of adding a negative component of quadratic chirp.

Figure 4:
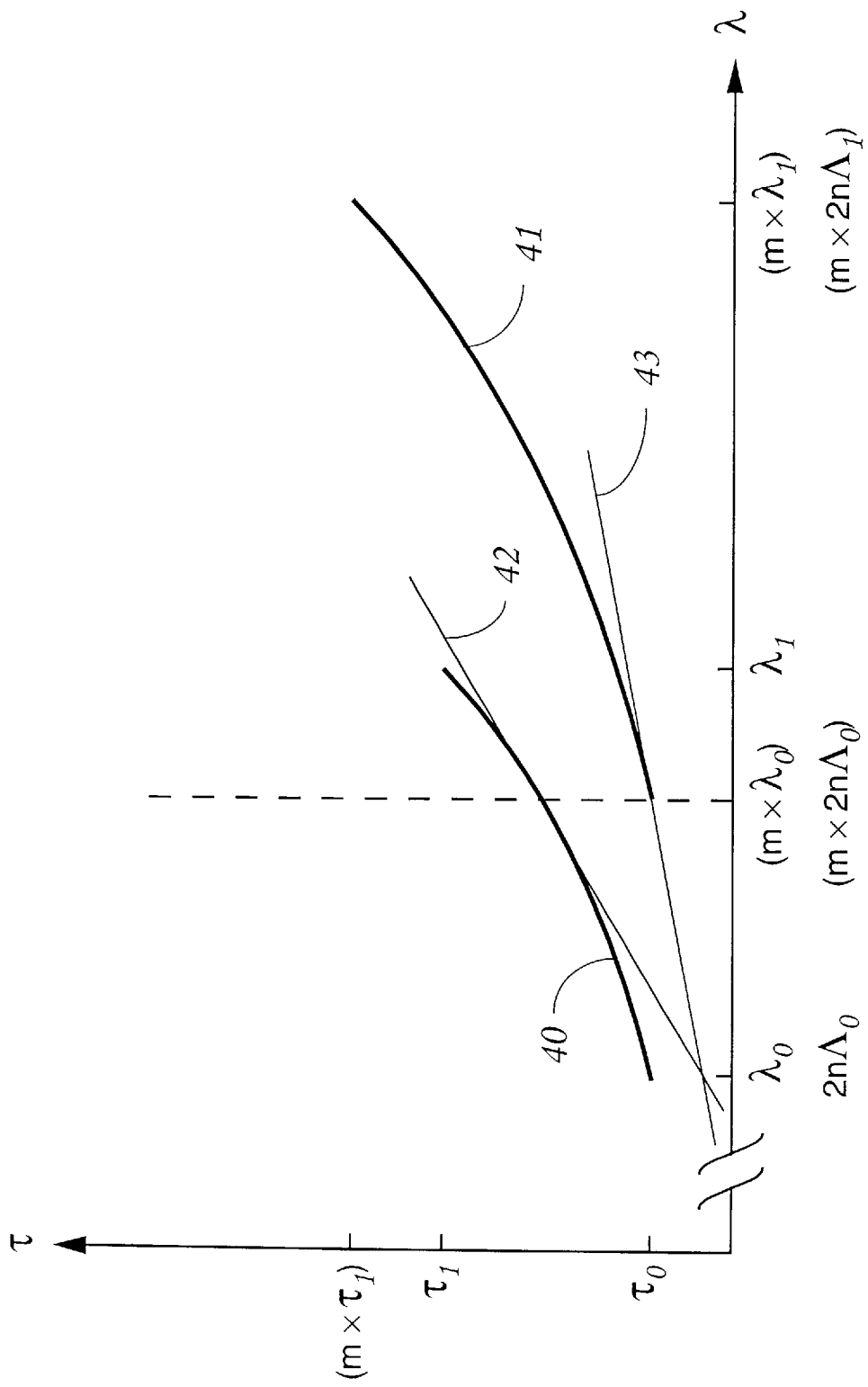
FIG. 4 is a representative plot illustrating how dispersion provided by an optical waveguide with a linearly and quadratically chirped Bragg reflective grating is altered by a scaling of its effective pitch by a tensile straining of that waveguide.

FIG. 4 shows the effect of stretching a grating that has positive linear chirp and positive quadratic chirp over the range of Bragg reflection wavelengths from $\lambda_0$ to $\lambda_1$. In the unstretched condition, the way the differential group delay, $\tau$, varies as a function of Bragg reflection wavelength, $\lambda$, is represented by trace 40. If that portion of the fibre extending between the first and last grating elements of the fibre is now stretched by an extension factor 'm', where $\lambda_0 < (m \times \lambda_0) < \lambda_1$, the delay to the beginning of the grating remains unchanged at $\tau_0$, and now the way the differential group delay, $\tau$, varies as a function of Bragg reflection wavelength, $\lambda$, is represented by trace 41. The grating pitch at this end is however expanded by the extension factor 'm' from $\Lambda_0$ (where $\Lambda_0 = \lambda_0/2n$) to $m \times \Lambda_0$. Accordingly trace 41 is an m-fold expanded replica of trace 40, with its commencement point shifted in the direction of the $\lambda$ axis from the point with the co-ordinates ($\lambda_0, \tau_0$) to that with the co-ordinates ($m\lambda_0, \tau_0$). Light of wavelength $m\lambda_0$ is reflected in the fibre at the point at which the grating pitch is $2n \times m\lambda_0$. The linear dispersion, $d\lambda/d\tau$, at this wavelength is given by the gradient of the differential group delay characteristic at this wavelength. In the case of the unstretched fibre, this is the gradient of the line 42 which is tangential to trace 40 at $\lambda = m\lambda_0$. In the case of the stretched fibre, this is the gradient of the line 43 which is tangential to trace 41 at $\lambda = m\lambda_0$. It is thus seen that the effect of the stretching has been to reduce the magnitude of the linear dispersion.

Figure 5:
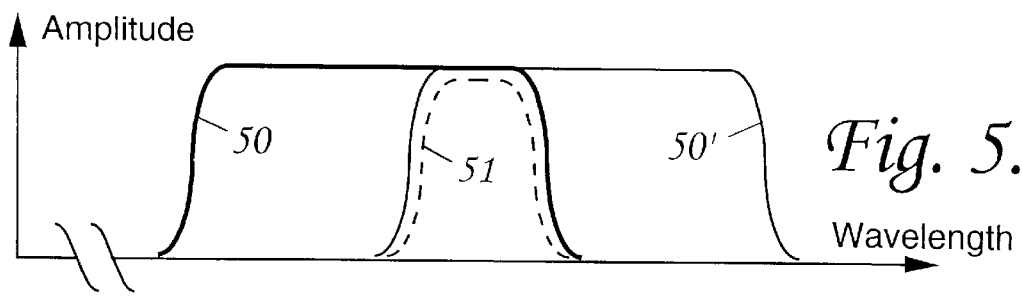
FIGS. 5 and 6a to 6d are diagrams illustrating how the spectral reflection wavebands of Bragg reflection gratings are shifted in wavelength by changes in the strain to which the optical fibres in which those gratings are created are subjected.
Figure 6A:
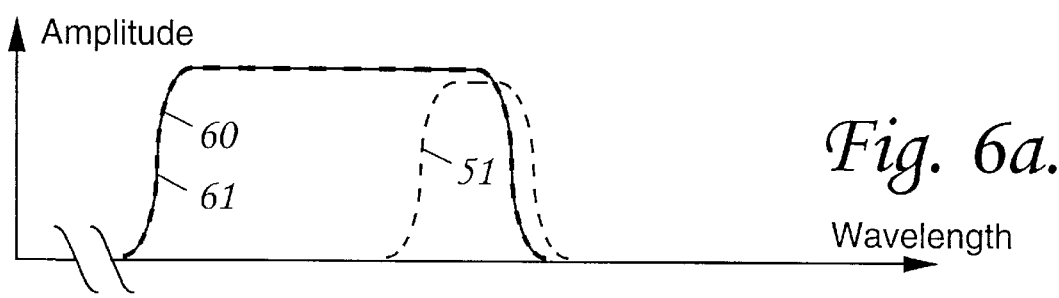
Figure 6B:
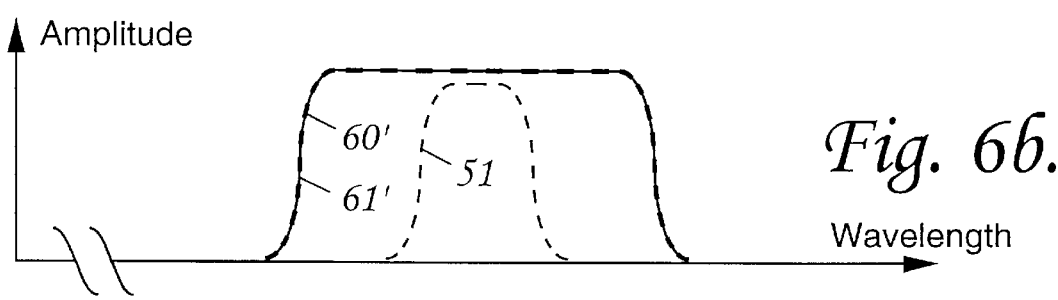
Figure 6C:
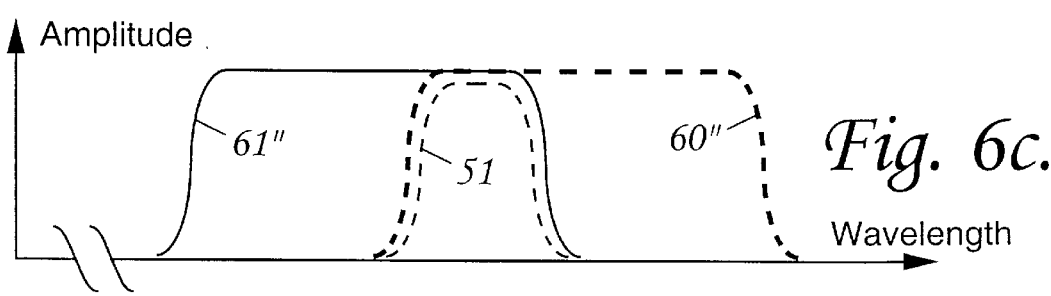
Figure 6D:
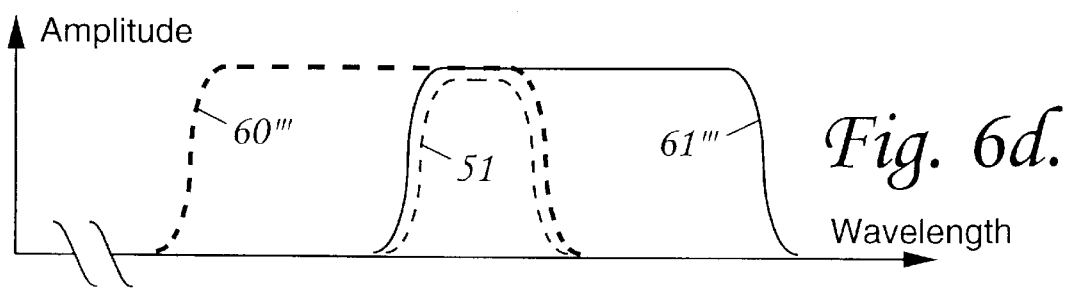

By way of a specific example, the grating 13 may be an approximately 90 mm long grating designed for operation at a (free space) wavelength in the region of 1500 nm, and having $D_0 = +200$ ps/nm and $Q_0 = +500$ ps/nm$^2$. With appropriate apodisation such a grating has a reflection band characteristic of the general shape illustrated at 50 in FIG. 5. The magnitude of the bandwidth may be determined from equation (8) above. Subjecting this grating to an increase in tensile strain shifts this characteristic to longer wavelengths. If the signal that is to be reflected by the grating, i.e. the signal the magnitude of whose dispersion is to be adjusted, has a bandwidth as represented by characteristic 51, then there is no point in increasing the tensile strain beyond the point at which the strain has shifted the characteristic to the position depicted at 50'. The amount that the characteristic 50 can be shifted in wavelength is limited by the strain that the fibre in which the grating is formed can safely withstand, but this amount of wavelength shift, expressed in proportional (dimensionless) terms as the number of bandwidths of the grating, is so large that it is clear that it is the bandwidth of the grating, rather than the strain that it can safely sustain, that limits the dispersion adjustment range that can be provided by the device. From FIG. 5, it is seen that if only one grating is strained, then the range of dispersion adjustment is proportional to the approximate difference in bandwidth between that of the grating and that of the signal. FIGS. 6*a* to 6*d* show how, by the use of differential straining of substantially identical gratings 13 and 14, the range of dispersion adjustment is approximately doubled. These two gratings, being identical, would afford linear and quadratic chirps of equal modulus and the same sign if light were launched into them from equivalent ends (i.e. in both instances light launch into their respective fine grating pitch ends). The two gratings are, however, required to afford linear and quadratic chirps of equal modulus but opposite sign, and this is achieved by arranging for the light to be launched into them from non-equivalent ends (i.e. light is launched into the fine pitch end of one of the chirped gratings and into the coarse pitch end of the other). FIG. 6*a* depicts, respectively at 60 and 61, the spectral characteristics of the two gratings 13 and 14 in their unstrained states. In their unstrained states the signal band 51 does not fall entirely within either of the wavebands 60 and 61, and so both gratings are required to be tensile strained to bring about full overlap. Both gratings are equally strained (common-mode straining) to bring, as depicted in FIG. 6*b*, the mid-band wavelengths of the wavebands of the two gratings, wavebands now respectively at 60' and 61', into substantial registry with the mid-band wavelength of the signal waveband 51. At this stage, the device is ready for changing the magnitude of the dispersion that the device affords, this being effected by a differential-mode straining of the two gratings, i.e. by increasing the strain in one of the gratings while reducing, by an equivalent amount, the strain in the other. Depicted in FIG. 6*c* is the condition in which the differential-mode strain that increases the strain in grating 13 has been increased to substantially the maximum extent possible consistent with leaving both reflection wavebands, now respectively at 60" and 61", compassing the signal waveband 51. It will be noted that the dispersion adjustment range between the conditions of FIGS. 6*b* and 6*c* is substantially the same as that described with reference to FIG. 5 relating to a device in which only one grating is strained. However in the present instance of both gratings being strained, an additional dispersion adjustment range can be brought about by a corresponding reversal of the sign of the differential straining, thereby providing, as depicted in FIG. 6*d*, the respective wavebands now at 60''' and 61'''.

It is clear that, instead of fibres 11 and 12 being connected to consecutive ports of a single 4-port circulator, fibre 11 could be connected to one port of one of a pair of series-connected 3-port circulators while fibre 12 is connected to a corresponding port of the other 3-port circulator. This provides a structure bearing superficial resemblance to the structure described by T Komukai et al., 'Fabrication of nonlinearly chirped fibre Bragg gratings for higher-order dispersion compensation', OFC '98 Technical Digest, Tuesday Afternoon, TuM2, pp 71–2. Closer examination quickly reveals that the two structures are, however, designed for quite different applications, and in consequence thereof are physically quite different. In particular, whereas the present invention requires its two gratings to have quadratic chirp components of opposite sign, the two gratings of the T Komukai et al. structure are required to have quadratic chirp components of the same sign. The fact that the T Komukai et al. structure employs gratings with the same sign of quadratic chirp component can be readily deduced from an examination of the relative curvatures of traces A and B of their FIG. 5, or alternatively by differentiation of their equations 6 and 7.

Figure 7:
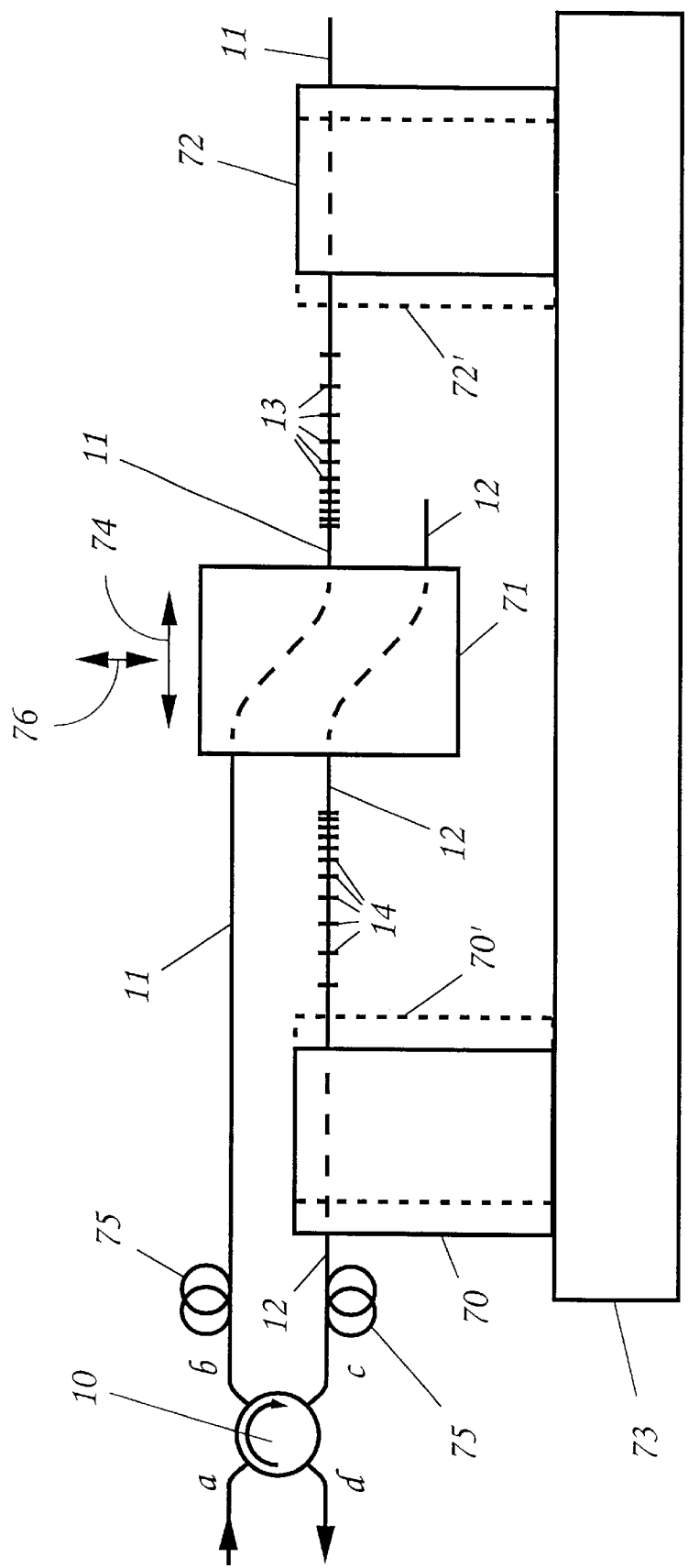
FIGS. 7, 8 and 9 are schematic diagrams illustrating the construction of alternative embodiments of adjustable dispersion compensation devices according to the present invention.

One of the ways in which the two fibres and their gratings may be differentially strained by an adjustable amount is schematically depicted in FIG. 7. In the dispersion adjuster of FIG. 7 the portions of the two fibres 11 and 12 that contain their respective gratings 13 and 14 are held under tension clamped between three clamps 70, 71 and 72. Clamps 70 and 72 are held fixed relative to a supporting platform 73 while clamp 71 is movable, as indicated by double-headed arrow 74, relative to the platform in the axial direction of the tensile strained portions of the two fibres between the clamps. The two fibres are in tension between the clamps, but not elsewhere, and the absence of tension in the fibres between the circulator 10 and the clamps is indicated by fibre loops 75. The clamps are arranged so that the length of the portion of fibre 11 that extends between clamps 71 and 72 substantially matches the corresponding length of the portion of fibre 12 that extends between clamps 70 and 71. Though the clamps 70 and 72 have been described as being fixed in relation to the platform 73, they may be movable during an initial set-up procedure, but fixed thereafter while the device is being used for adjustment of dispersion. At the start of this set-up procedure these clamps may be positioned respectively as shown in broken outline at 70' and 72', positions at which the portions of the fibres 11 and 12 extending between the clamps are substantially untensioned. Then, in moving the two clamps to the positions 70 and 72, these two portions of the fibres together with their gratings 13 and 14, become tensile strained to substantially the same extent. In this way the spectral reflection characteristics of those two gratings are shifted in wavelength from the positions represented in FIG. 6*a* to those represented in FIG. 6*b*. At this stage the clamps 70 and 72 are fixed in position on the platform 73. Thereafter, adjustment of the magnitude of dispersion provided by the device is obtained by moving the clamp 71 in the direction of the double-headed arrow 74 within a displacement range whose extremes provide the gratings with the spectral reflection characteristics respectively represented in FIGS. 6*c* and 6*d*. Optionally provision may be made for movement of clamp 71 additionally in the direction of double-headed arrow 76, i.e. in a direction at right-angles to the axial extent of the fibres. Moving the clamp 71 in this way has the effect of increasing the common-mode strain present in the portions of the fibres that extend between clamps 70 and 72.

Figure 8:
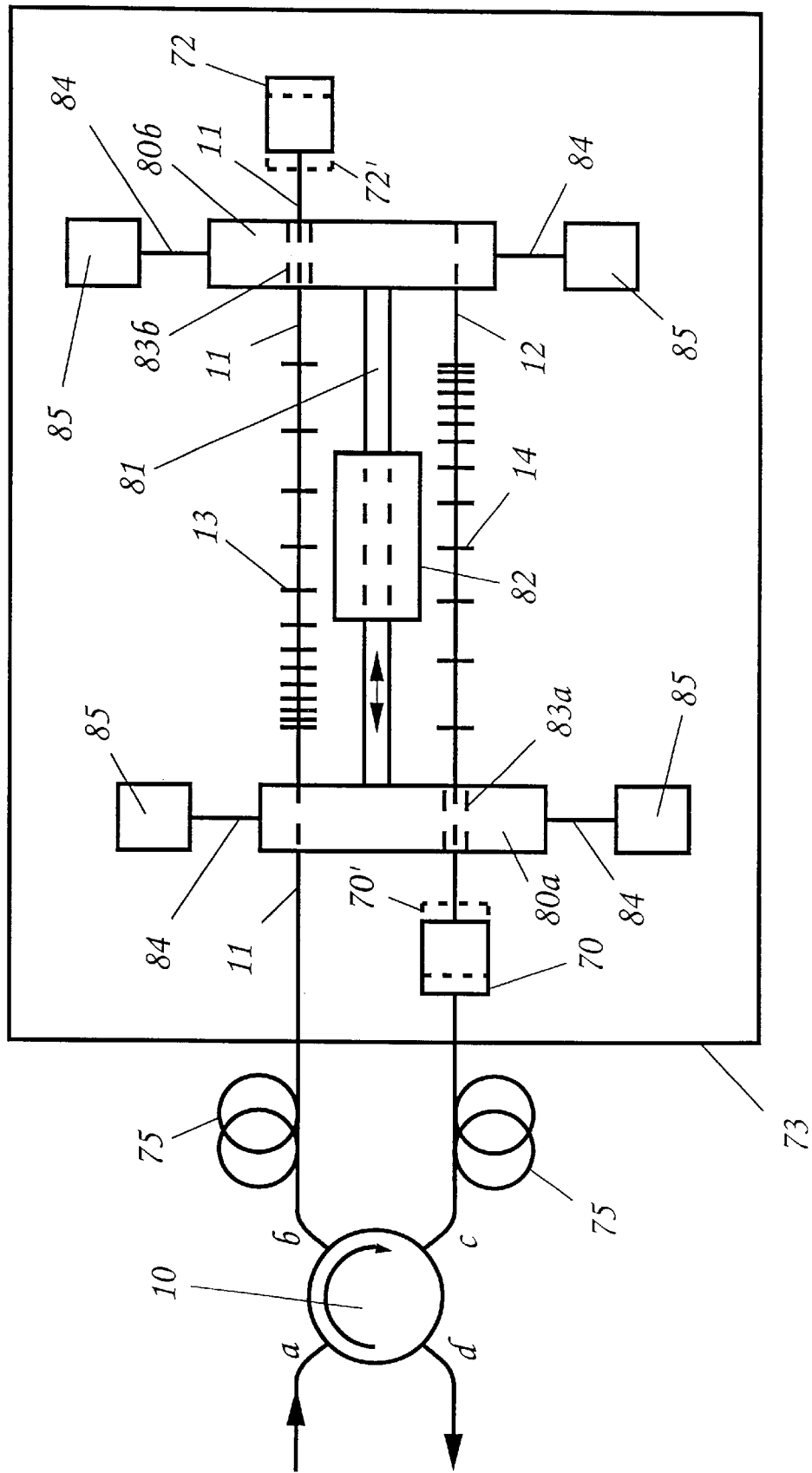

A modified form of the adjuster of FIG. 7 is depicted in FIG. 8. The adjuster of FIG. 8 has many integers that have their counterparts in the adjuster of FIG. 7, and accordingly have been identified with corresponding index numerals in the two Figures. One major difference between the two adjusters is that in the adjuster of FIG. 8 the two gratings are arranged side-by-side. The function of the movable clamp 71 of the adjuster of FIG. 7 is taken, in the adjuster of FIG. 8, by an assembly comprising a pair of beams 80*a* and 80*b* connected by a rigid shaft 81 that is axially movable, under the control of a drive mechanism (not shown), through a mounting bracket 82 secured to the platform 73. Fibre 11 is secured to beam 80*a*, but passes freely through an aperture 83*b* in beam 80*b* to the other point at which this fibre is secured, namely clamp 72. Correspondingly, fibre 12 is secured to beam 80*b*, but passes freely through an aperture 83a in beam 80a to the other point at which this fibre is secured, namely clamp 70. Having regard to the elastic modulus of the fibre attached to it, together with the stiffness of its associated two leaf springs 84, the relative positioning along each beam of the point of attachment of that fibre, and of the connecting shaft, is chosen to provide substantial balance of the turning moments about the point of attachment of the connecting shaft provided by the fibre and the two leaf springs.

Figure 9:
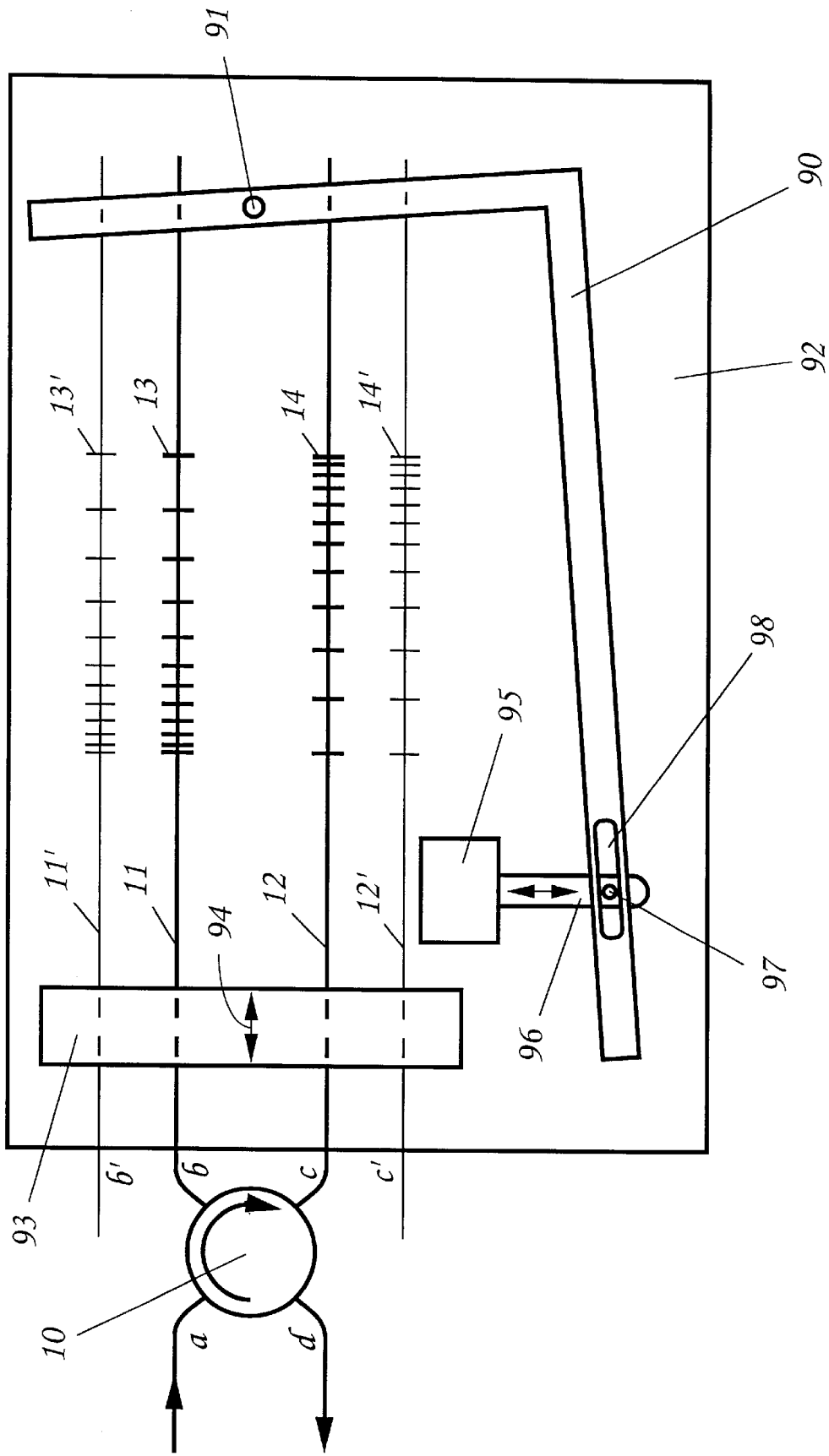

A further form of adjuster is depicted in FIG. 9. In this adjuster there is a generally L-shaped lever 90 that is capable of being articulated about a fixed pivot 91, or other form of fulcrum, that is secured to a supporting platform 92. Also secured to the platform 92 is a fibre clamp 93, but this clamp is movable relative to the platform 92 in the direction indicated by double-headed arrow 94. Having been moved to a selected position, the clamp 93 is also capable of being secured in that position. The two portions of the fibres 11 and 12 that contain their respective gratings 13 and 14 are clamped to the L-shaped lever 90 and the fibre clamp 93 so as to extend in straight lines that are on opposite sides of, and substantially equidistant from, the pivot 91, and are substantially parallel with the direction of movement of the clamp 93. Clamping is performed while the two fibres are substantially unstrained, and while the L-shaped lever 90 is oriented to provide substantially matched lengths of fibre extending between lever 90 and the clamp 93. Fibre clamp 93 is then moved away from the pivot 91 so as to provide common-mode pre-tensioning (straining) of the two gratings 13 and 14 so as to shift the spectral reflection characteristics of those two gratings in wavelength from the positions represented in FIG. 6a to those represented in FIG. 6b. The fibre clamp 93 is then secured in that position. Thereafter, adjustment of the magnitude of dispersion provided by the device is obtained by articulation of the lever 90 about its pivot 91 under the control of an actuator mechanism 95. Such a mechanism may for instance comprise a movable piston 96 carrying a pin 97 engaged in a slot 98 formed in the lever 90. This articulation is within an angular range whose extremes provide the gratings 13 and 14 with the spectral reflection characteristics respectively represented in FIGS. 6c and 6d.

One or more additional pairs of fibres with associated gratings, such as fibres 11' and 12' with respective gratings 13' and 14', may be added to the lever and clamp structure, each additional pair of fibres being connected in a similar manner to its own associated four-port circulator (not shown) in order to provide two or more adjusters that operate in a ganged way. The dispersion adjustment provided by the gratings 13' and 14' in fibres 11' and 12' is m-times larger than that provided by 13 and 14 in fibres 11 and 12, where m is the ratio of the distance from either fibre 11' and 12' to the pivot 81 to the distance from either fibre 11 and 12 to the pivot. The ratio 'm' can be unity, in which case the different fibre pairs are located in different planes.

What is claimed is:

1. A device exhibiting linear optical dispersion of adjustable magnitude, which device includes first and second optical fibre waveguides provided with respective first and second chirped Bragg reflection gratings, which gratings exhibit, in the absence of strain, quadratic chirp of substantially matched modulus, and which gratings are arranged to define an optical transmission path that includes sequential reflection in both gratings with a relative orientation to provide quadratic chirp of opposite sign, which device maintains each fibre waveguide, over the length of its Bragg grating, in substantially uniform tensile strain, and includes a differential mode strain adjuster operative to adjust the magnitude of the dispersion exhibited by the device by reducing the tensile strain in one of said first and second gratings while increasing, by a substantially equivalent amount, the tensile strain in the other of said gratings.

2. A device as claimed in claim 1, wherein the differential mode strain adjuster is operative to adjust the strain in the first and second gratings by articulation of a lever to which are attached portions of the first and second fibre waveguides, which portions are spaced from their respective gratings.

3. A device as claimed in claim 2, which device additionally includes a common-mode strain adjuster operative to adjust the strain in the first and second gratings by substantially equal amounts of the same sign by translational movement of a beam to which further portions of the first and second fibre waveguides are attached, which further portions are disposed such that each grating lies between its associated attachment portion and its associated further attachment portion.

4. A device as claimed in claim 1, wherein the Bragg grating reflectors are sampled Bragg grating reflectors.

5. A device as claimed in claim 1, wherein the differential mode strain adjuster is operative to adjust the strain in the first and second gratings by translational movement of an assembly to which are attached portions of the first and second fibre waveguides, which portions are spaced from their respective gratings.

6. A plurality of devices as claimed in claim 2, wherein the lever of each device is a lever that is common to all of the devices.

7. A method of providing linear optical dispersion of adjustable magnitude, in which method light is caused to make in sequence first and second spectrally distributed reflections respectively in first and second single mode optical fibre waveguides, which reflections are made respectively in first and second chirped Bragg grating reflectors present in first and second tensile strained respective regions of the first and second fibre waveguides, wherein, in the absence of strain in said regions, said gratings exhibit quadratic chirp of substantially matched modulus, and are in relative orientation such that the quadratic chirp that they exhibit to said light is of opposite sign, and in which method the value of linear dispersion afforded to said light is adjusted by reducing the tensile strain in one of said first and second regions while increasing, by a substantially equivalent amount, the tensile strain in the other of said regions.

8. A method as claimed in claim 7, wherein the Bragg grating reflectors are sampled Bragg grating reflectors.

* * * * *